No. 627,309. Patented June 20, 1899.
H. O. REESE.
TINNER'S TONGS.
(Application filed Mar. 9, 1899.)
(No Model.)
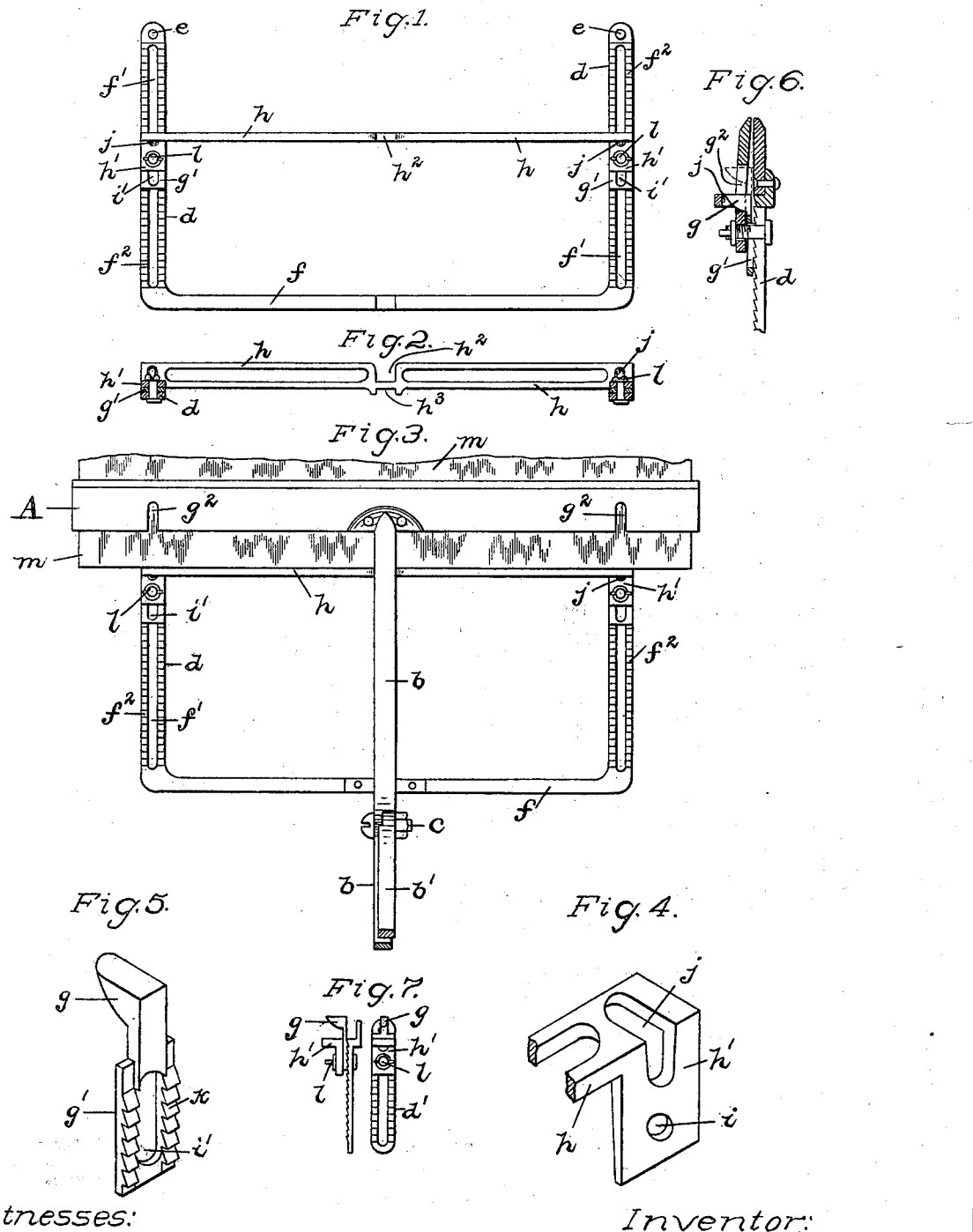
Witnesses:
Charles B. Mann Jr.
Geo. Koether.
Inventor:
Henry O. Reese
By Chas. B. Mann
Attorney.

UNITED STATES PATENT OFFICE.

HENRY O. REESE, OF BALTIMORE, MARYLAND.

TINNERS' TONGS.

SPECIFICATION forming part of Letters Patent No. 627,309, dated June 20, 1899.

Application filed March 9, 1899. Serial No. 708,302. (No model.)

*To all whom it may concern:*

Be it known that I, HENRY O. REESE, a citizen of the United States, residing at Baltimore, in the State of Maryland, have invented certain new and useful Improvements in Tinners' Tongs, of which the following is a specification.

This invention relates to an improved gage for attachment to tinners' tongs. The class of tongs here referred to is that employed by tinners in making seams on tin roofs and for other purposes.

The object of the invention is to provide a gage of simple construction which will give a greater range of adjustment than those heretofore in use.

The invention is illustrated in the accompanying drawings, in which—

Figure 1 is a view of the gaging device separate from the tongs. This is a double gage united by a bar. Fig. 2 is a view of the gage-plate of the gaging device seen in Fig. 1. Fig. 3 is a view of a pair of tongs to which the gaging device is attached clamping a sheet of tin-plate. Fig. 4 is a detail perspective view, on a larger scale, of one end of the gage-plate. Fig. 5 is a perspective view of one of the adjustable slides. Fig. 6 is a sectional view showing blade, terminal, dog, and set-screw. Fig. 7 shows two views of a modified form of gage, a single gage. Two such gages may be used, but are not united.

The ordinary tinners' tongs have two blades or jaws, the upper one of which, A, is shown in Fig. 3. Each blade or jaw is attached to a shank or handle $b$ $b'$, said two shanks being crossed and united by a pivot-bolt or rivet $c$. Two bars $d$ each have a rivet-hole $e$ at its end for attachment to the lower blade. The other ends of these bars are united by a connecting-bar $f$. Each bar also has a slot $f'$, extending longitudinally, and on one face is provided with cross-serrations or ratchet-teeth $f^2$. An adjustable gage-plate $h$ extends across between the two bars $d$ and at each end is provided with a lateral or right-angled terminal $h'$. A bolt-hole $i$ is in each terminal, and an angle-slot $j$ is partly in the terminal and partly in the stop-plate. (See Fig. 4.) An adjusting-dog $g$ has a plate $g'$, provided with a bolt-slot $i'$, and on one side of the plate are cross-serrations or ratchet-teeth $k$, which fit into or engage the like serrations $f^2$ on the bars $d$ and are held in such engagement by a bolt and set-screw $l$, which passes through the bolt-hole $i$ on the terminal, through the bolt-hole $i'$ on the dog, and through the slot $f'$ on the bar $d$. The dog $g$ in its lowest position normally projects into and occupies the angle-slot $j$; but the dog is adapted to be raised out of the said slot and to enter a slot or notch $g^2$ in the edge of the plate or jaw A. This will be understood more particularly by reference to Fig. 6 of the drawings.

In the description thus far reference has been made to the connected double-gage device, Figs. 1 to 6. This device, with a connecting gage-plate $h$, affords a bearing all along the edge of the sheet of tin $m$.

The connecting-bar $f$ at the center has a rectangular space, in which one of the handle-bars works when the parts are in position to use, and the gage-plate $h$ is provided with a notch $h^2$ at its center on one side for a similar purpose and is also provided on the other side with a notch $h^3$ for the other handle-bar.

Reference will now be made to the modification Fig. 7, where the connecting gage-plate is dispensed with and a single gage device is to be employed. One of these is to be attached to each bar $d$; but there will be no connecting-bar between the two like the bar $f$ in Figs. 1 and 3. This view, Fig. 7, shows the same parts as are seen in Figs. 4, 5, and 6, and their operation is the same. The only difference between the form in Fig. 7 and that in the other figures is that the slotted bar $d'$ in Fig. 7 is shorter than the corresponding bar $d$ in the other figures and that there is no connecting-bar $f$ nor connecting-plate $h$. This gage device enables a bend to be made of any width that may be desired in forming joints or seams of tin roofs or for other purposes. By means of the slot or notch $g^2$ on the tongs-plate A and the gage-dog $g$ the device can make a narrower bend than any other device known to me and is more simple.

Having thus described my invention, what I claim as new, and desire to secure by Letters Patent, is—

1. A gaging device for tinners' tongs having in combination a blade of the tongs; two bars each riveted by one end to the blade and provided with a longitudinal slot and on one face with cross-serrations, $f^2$; a gage-plate movable on said two bars and having at each end a right-angled terminal provided with a bolt-hole, $i$, and an angle-slot, $j$; an adjusting-dog which may occupy the said angle-slot and is provided with a serrated plate having a slot, $i'$; and a set-screw bolt passed through the terminal bolt-hole, through the dog-slot and through the longitudinal slot in the bar, as set forth.

2. A gaging device for tinners' tongs having in combination a blade of the tongs; two bars each riveted by one end to the blade and provided with a longitudinal slot and on one face with cross-serrations; a gage device on each bar provided with an angle-slot; an adjusting-dog which may occupy the said angle-slot and is provided with a serrated plate having a slot, $i'$; and a set-screw bolt holding these parts together.

3. A gaging device for tinners' tongs having in combination a blade of the tongs provided with two edge slots or notches, $g^2$; two bars each riveted by one end to the other blade of the tongs and provided with a longitudinal slot and on one face with cross-serrations; a gage device on each bar provided with an angle-slot; an adjusting-dog which may occupy the said angle-slot and is provided with a serrated plate having a slot, $i'$; said dogs being adapted to enter the said edge slots or notches; and a set-screw bolt holding each dog and gage device to the serrated bar.

In testimony whereof I affix my signature in the presence of two witnesses.

HENRY O. REESE.

Witnesses:
  CHARLES B. MANN, Jr.,
  GEO. KOETHER.